US012691538B1

(12) United States Patent \
Revheim et al.

(10) Patent No.: US 12,691,538 B1 \
(45) Date of Patent: Jul. 28, 2026

(54) VACUUM FITTING ADAPTER FOR BENCH DOG HOLES

(71) Applicants: Glenn Revheim, Ivins, UT (US); Thomas Sexton, Blountville, TN (US)

(72) Inventors: Glenn Revheim, Ivins, UT (US); Thomas Sexton, Blountville, TN (US)

( * ) Notice: Subject to any disclaimer, the term of this patent is extended or adjusted under 35 U.S.C. 154(b) by 0 days.

(21) Appl. No.: 19/382,946

(22) Filed: Nov. 7, 2025

Related U.S. Application Data

(60) Provisional application No. 63/844,448, filed on Jul. 15, 2025, provisional application No. 63/786,103, filed on Apr. 9, 2025.

(51) Int. Cl. \
  *B23Q 3/08* (2006.01) \
  *B25B 11/00* (2006.01)

(52) U.S. Cl. \
  CPC ............ *B23Q 3/088* (2013.01); *B25B 11/005* (2013.01)

(58) Field of Classification Search \
  CPC . F16L 33/00; F16L 31/00; F16L 21/03; B25B 11/005; B23Q 3/088 \
  See application file for complete search history.

(56) References Cited

U.S. PATENT DOCUMENTS

| | | | | |
|---|---|---|---|---|
| 2,680,994 A | * | 6/1954 | Wood | .................... B25B 11/005 |
| | | | | 269/21 |
| 5,853,169 A | * | 12/1998 | Hern | ..................... B25B 11/005 |
| | | | | 269/21 |
| 6,764,258 B1 | | 7/2004 | Akre | |
| 2003/0025259 A1 | * | 2/2003 | Nesbit | .................. B25B 11/005 |
| | | | | 269/21 |
| 2005/0166731 A1 | | 8/2005 | Jones | |
| 2017/0345700 A1 | | 11/2017 | Oremus | |
| 2021/0138566 A1 | | 5/2021 | Gibson | |
| 2023/0330818 A1 | | 10/2023 | Kouros | |

* cited by examiner

*Primary Examiner* — Tyrone V Hall, Jr. \
(74) *Attorney, Agent, or Firm* — QuickPatents; Kevin Prince

(57) ABSTRACT

A vacuum fitting adapter is configured for installation in a bench dog hole of a worktop to provide vacuum-assisted workholding while keeping the top surface clear and unobstructed. The adapter includes a cylindrical adapter body sized to be inserted into the bench dog hole and a vacuum connection port for attachment to a vacuum source. At least one sealing element on the adapter body reduces fluid leakage between the adapter body and the bench dog hole and creates a friction fit for toolless installation and removal. A retention mechanism is configured to press outwardly against interior sidewalls of the bench dog hole to enhance retention of the adapter body. The adapter provides a portable alternative to traditional mechanical clamps, allowing quick repositioning to any location on the worktable grid to securely hold a workpiece while leaving the work surface unobstructed when not in use.

15 Claims, 12 Drawing Sheets

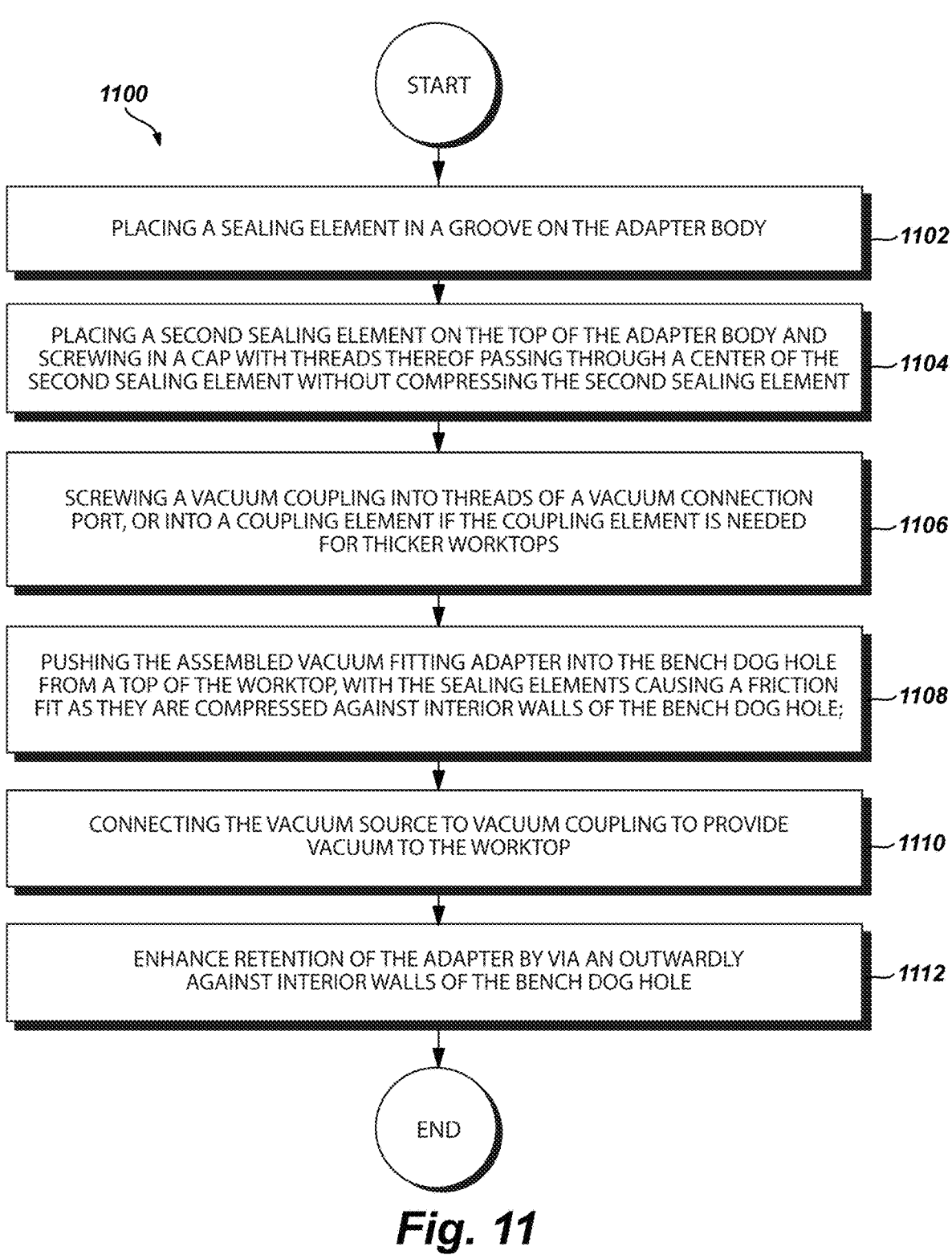

*1100*

START

PLACING A SEALING ELEMENT IN A GROOVE ON THE ADAPTER BODY ~1102

PLACING A SECOND SEALING ELEMENT ON THE TOP OF THE ADAPTER BODY AND SCREWING IN A CAP WITH THREADS THEREOF PASSING THROUGH A CENTER OF THE SECOND SEALING ELEMENT WITHOUT COMPRESSING THE SECOND SEALING ELEMENT ~1104

SCREWING A VACUUM COUPLING INTO THREADS OF A VACUUM CONNECTION PORT, OR INTO A COUPLING ELEMENT IF THE COUPLING ELEMENT IS NEEDED FOR THICKER WORKTOPS ~1106

PUSHING THE ASSEMBLED VACUUM FITTING ADAPTER INTO THE BENCH DOG HOLE FROM A TOP OF THE WORKTOP, WITH THE SEALING ELEMENTS CAUSING A FRICTION FIT AS THEY ARE COMPRESSED AGAINST INTERIOR WALLS OF THE BENCH DOG HOLE; ~1108

CONNECTING THE VACUUM SOURCE TO VACUUM COUPLING TO PROVIDE VACUUM TO THE WORKTOP ~1110

ENHANCE RETENTION OF THE ADAPTER BY VIA AN OUTWARDLY AGAINST INTERIOR WALLS OF THE BENCH DOG HOLE ~1112

END

*Fig. 11*

VACUUM FITTING ADAPTER FOR BENCH DOG HOLES

CROSS REFERENCE TO RELATED APPLICATIONS

This application claims the benefit of U.S. Provisional Patent Application 63/786,103, filed on Apr. 9, 2025, and U.S. Provisional Patent Application 63/844,448, filed on Jul. 15, 2025, both incorporated herein by reference.

STATEMENT REGARDING FEDERALLY SPONSORED RESEARCH AND DEVELOPMENT

Not Applicable.

FIELD OF THE DISCLOSURE

The present disclosure generally relates to a vacuum fitting adapter for holding an object or workpiece tightly to a Multi-Function Table (MFT), and more specifically, to a vacuum fitting adapter that fits within a bench dog hole.

BACKGROUND

Multi-Multi-function tables or tops (MFTs) have become increasingly popular among woodworkers and do-it-yourself (DIY) enthusiasts as versatile work surfaces. While designs vary, a typical MFT includes a planar work surface formed of plywood, medium-density fiberboard (MDF), or another engineered wood product, having a grid pattern of openings commonly referred to as bench dog holes. These holes were originally incorporated to receive bench dogs, clamps, and similar accessories. One primary advantage of providing a plurality of such holes is the ability to securely clamp workpieces of various sizes to the tabletop for common woodworking operations such as sanding, routing, cutting, and planing using hand tools or router sleds.

However, the use of mechanical clamps can often obstruct access to the workpiece or interfere with the movement of tools, involving frequent repositioning of the clamps during a task. To address such limitations, vacuum clamping systems have long been used in connection with computer numerical control (CNC) machinery. Numerous vacuum table configurations exist, often tailored for specific equipment or applications. In woodworking and related industries, large integrated vacuum tables are commonly used with CNC machines to hold material in place during machining. Smaller, mobile vacuum tables, as well as modular vacuum pods or pads, are also known.

These auxiliary vacuum systems eliminate the need for mechanical clamps but typically rest on or above the work surface, thereby occupying valuable workspace and often requiring removal when the full bench surface is needed for other operations. Additionally, existing vacuum systems often require complex installation procedures, specialized mounting hardware, or permanent modification of the work surface. Many systems also lack the flexibility to be quickly repositioned to different locations on the worktop as project requirements change.

Accordingly, there is a need for a compact and adaptable vacuum system that can be integrated into the existing bench dog hole grid of a conventional MFT without permanent modification. Such a system would ideally provide toolless installation and removal, maintain a flush profile with the work surface when not in use, and allow quick repositioning to any bench dog hole location while providing reliable vacuum retention and sealing.

SUMMARY

The present invention is a vacuum fitting adapter configured for installation in a bench dog hole of a worktop to provide vacuum-assisted workholding while keeping the top surface clear and unobstructed. The present disclosure relates to improvements and alternative embodiments of the vacuum fitting adapter first disclosed in provisional patent application 63/844,448 filed Jul. 15, 2024, which provided frictional retention within a worktop hole using elastomeric sealing elements. Subsequent development determined that the adjustable clamping collar described in the provisional application, while effective for mechanical retention, is not required for proper retention or sealing when the adapter body is dimensioned appropriately with suitable elastomeric sealing elements. The adapter provides a portable alternative to traditional mechanical clamps through toolless installation and removal.

According to one embodiment, a vacuum fitting adapter configured for installation in a bench dog hole of a worktop includes a cylindrical adapter body sized to be inserted into the bench dog hole. A vacuum connection port is on the adapter body for attachment to a vacuum source. At least one sealing element on the adapter body is operative to reduce fluid leakage between the adapter body and the bench dog hole and create a friction fit therebetween for toolless installation and removal. A retention mechanism is configured to press outwardly against interior sidewalls of the bench dog hole to enhance retention of the adapter body.

According to one embodiment, a method of installing a vacuum fitting adapter in a bench dog hole of a worktop includes inserting a cylindrical adapter body into the bench dog hole. A vacuum connection port on the adapter body is attached to a vacuum source. Fluid leakage between the adapter body and the bench dog hole is reduced and a friction fit is created by providing at least one sealing element on the adapter body. Retention of the adapter is enhanced via a retention mechanism configured to press outwardly against interior sidewalls of the bench dog hole.

The present invention addresses the drawbacks of the prior art by providing a compact and adaptable vacuum system that integrates into the existing bench dog hole grid of a conventional MFT without permanent modification. The vacuum fitting adapter provides toolless installation and removal, maintains a flush profile with the work surface when not in use, and allows quick repositioning to any bench dog hole location while providing reliable vacuum retention and sealing. The invention eliminates the workspace obstruction caused by auxiliary vacuum systems that rest on or above the work surface, while avoiding the complex installation procedures, specialized mounting hardware, or permanent modifications required by existing systems. Other features and advantages of the present invention will become apparent from the following more detailed description, taken in conjunction with the accompanying drawings, which illustrate, by way of example, the principles of the invention.

DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

FIG. 11 presents an illustrative process related to installing the vacuum fitting adapter in bench dog hole of worktop.

DETAILED DESCRIPTION

Figure 1A:
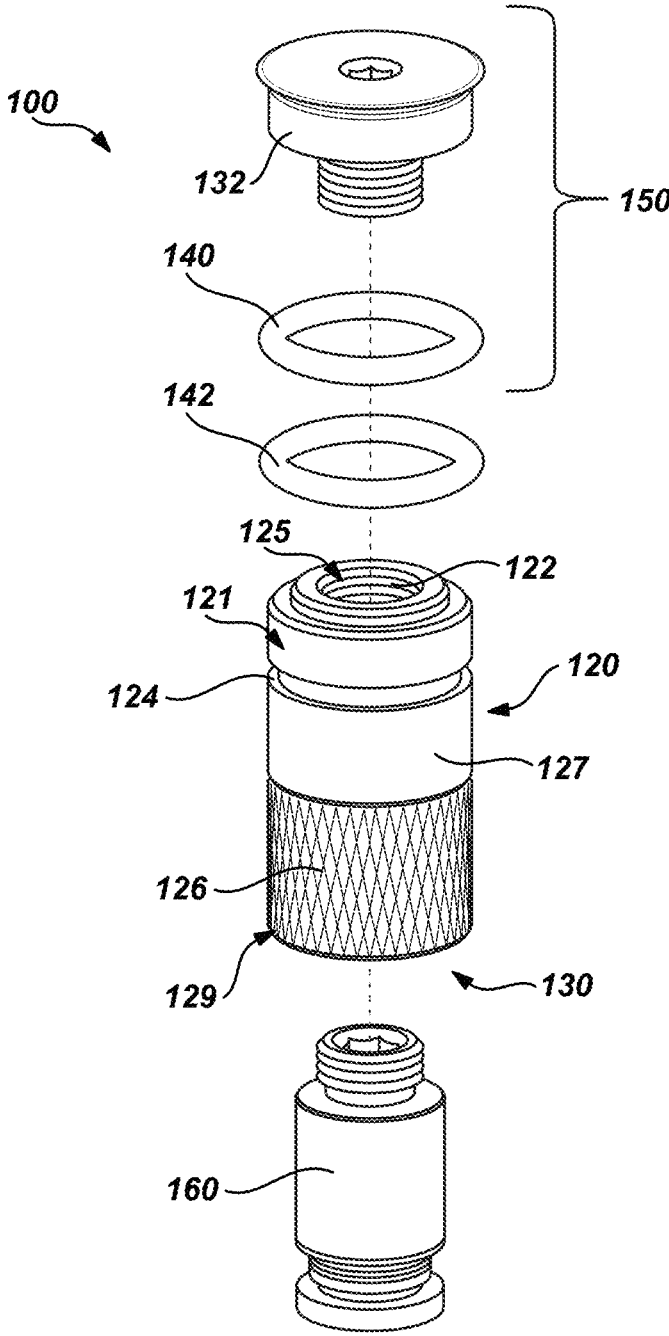
FIGS. 1A and 1B provide exploded perspective views of a vacuum fitting adapter.

Illustrative embodiments of the disclosure are described below. The following explanation provides specific details for a thorough understanding of and enabling description for these embodiments. One skilled in the art will understand that the disclosure may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements but can also mean a singular element. When the words "substantially" or "about" are used, if a quantitative measurement is necessary, within 95% of "complete" or "exact" should be considered the meaning. The term "the disclosure" or "the present disclosure" should always be construed as "an embodiment of the disclosure."

The present disclosure is a vacuum fitting adapter 100 that may be mounted within a bench dog hole 216 of a MFT or any workbench with holes, for connecting vacuum fittings, which vacuum-hold workpieces 820 with precision and without movement on the top surface 202. The vacuum fitting adapter 100 includes a cylindrical adapter body 120 with a vacuum connection port 130 that enables vacuum assisted workholding while keeping the top surface 202 clear and unobstructed. Such a configuration provides a portable alternative to traditional mechanical clamps that can be easily repositioned through toolless installation and removal. The vacuum fitting adapter 100 can be quickly repositioned to any location on the worktable grid to securely hold a workpiece 820, while leaving the primary top surface 202 unobstructed when not in use. Unlike conventional inserts that rely solely on mechanical fasteners, the present vacuum fitting adapter 100 integrates an elastomeric sealing interface that both retains the vacuum fitting adapter 100 and provides an airtight path for vacuum flow through the worktop 215. Thus, the disclosure provides a portable, lightweight, and user-friendly vacuum system that enhances work-holding versatility and efficiency for MFT users.

Figure 1B:
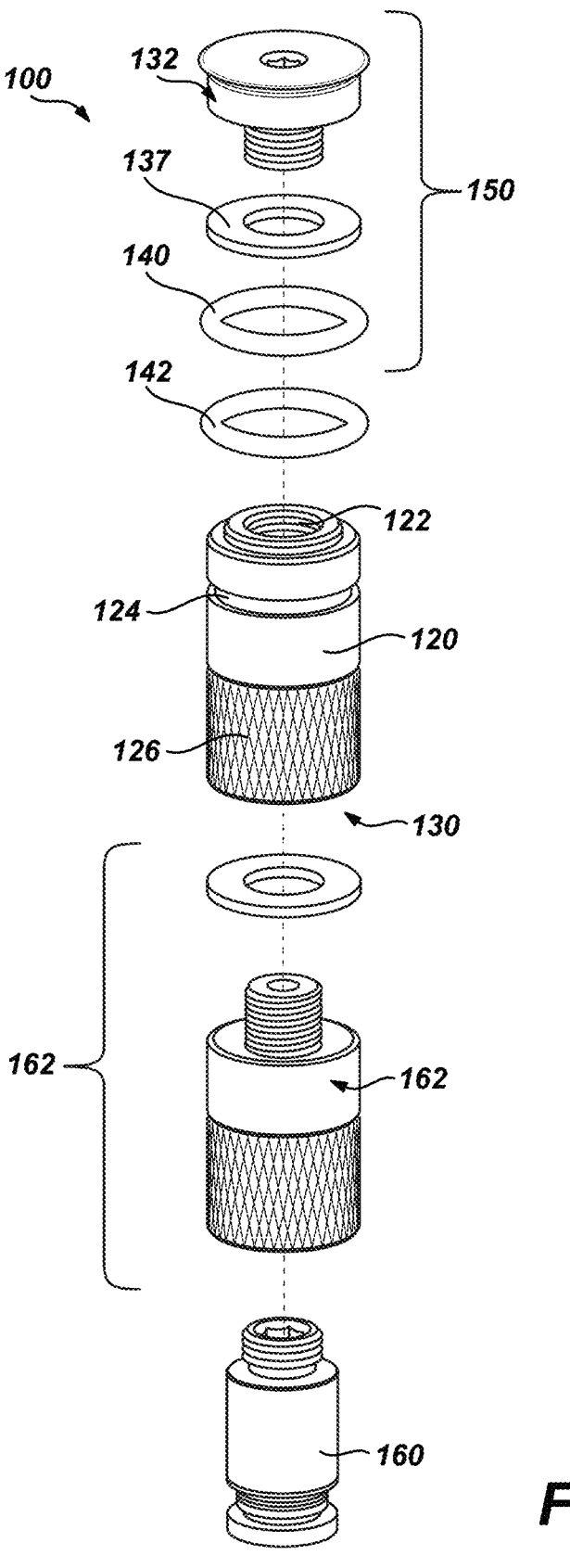

FIGS. 1A and 1B provide exploded perspective views of the vacuum fitting adapter 100. The retention mechanism 150 comprises a cap 132 and a second sealing element 140. A sealing element 142 is positioned on the adapter body 120 for sealing but is not part of the retention mechanism 150.

The cylindrical adapter body 120 has a gripping surface 126. The cylindrical adapter body 120 has a through hole 125 traversing from a top end 121 to a bottom end 129 thereof. The top of the cylindrical adapter body 120 has threading 122 operative to couple with the cap 132. The cylindrical adapter body 120 includes a groove 124 laterally positioned around an external surface 127 of the cylindrical adapter body 120 and configured to receive the sealing element 142. The sealing element 142 is positioned in the groove 124 on the cylindrical adapter body 120 for creating a friction fit and seal with the bench dog hole 216. The second sealing element 140 is used with the cap 132 as part of the retention mechanism 150 and is not positioned in the groove 124. The vacuum fitting adapter 100 is configured for installation in the bench dog hole 216 of the worktop 215.

Figure 2:
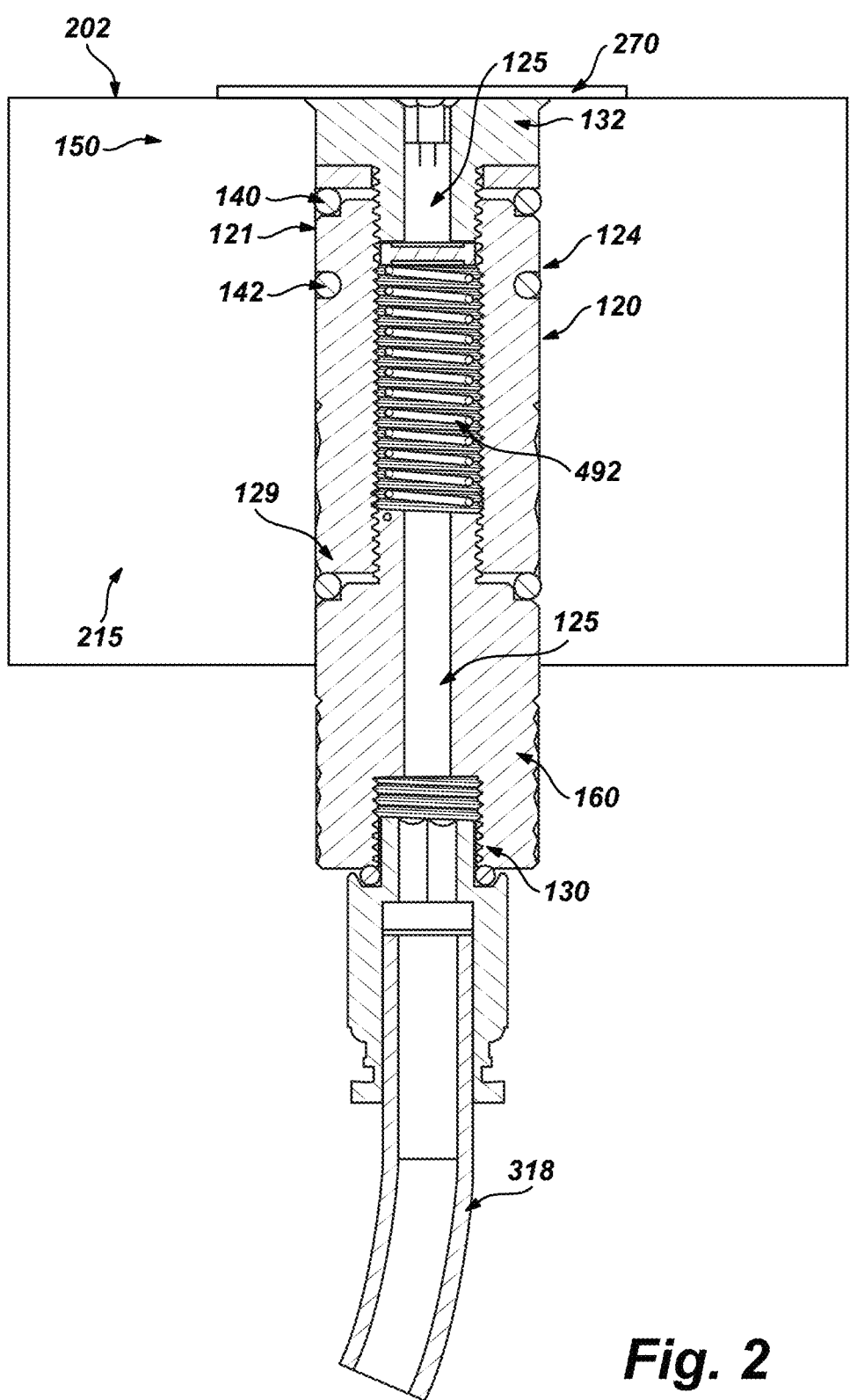
FIG. 2 is a cross-section side view of the vacuum fitting adapter installed in a bench dog hole of a worktop.

The vacuum fitting adapter 100 comprises the cylindrical adapter body 120 sized to be inserted into the bench dog hole 216, discussed in more detail in the context of FIG. 2. The bottom end 129 of the cylindrical adapter body 120 includes the vacuum connection port 130. The vacuum coupling 160 is attached to the vacuum connection port 130 and configured for connection to the vacuum source 318. The sealing element 142 on the cylindrical adapter body 120 is operative to reduce fluid leakage between the cylindrical adapter body 120 and the bench dog hole 216 and create a friction fit therebetween for toolless installation and removal. The retention mechanism 150 is configured to press outwardly against interior sidewalls 217 of the bench dog hole 216 to enhance retention of the cylindrical adapter body 120. The retention mechanism 150 preferably comprises the cap 132 that compresses the second sealing element 140 to expand the second sealing element 140 to contact the interior sidewall 217 of the bench dog hole 216.

In certain embodiments, the vacuum fitting adapter 100 can be pre-assembled and installed from the top surface 202 of the worktop 215. The cylindrical adapter body 120 is pressed into the bench dog hole 216 until the cap 132 sits flush with the top surface 202, with the sealing elements 140, 142—such as elastomeric O-rings or other elastomeric components—providing frictional engagement and an airtight seal without the use of tools or additional fastening components.

In various embodiments, one or more coupling elements 162 attach below the cylindrical adapter body 120 to extend the cylindrical adapter body 120 and the vacuum coupling 160 downwardly for thicker worktops 215.

The threading 122 is distributed laterally within an inner surface along the through hole 125. The threading 122 connects the cylindrical adapter body 120 to the vacuum coupling 160 as well as to the cap 132. The groove 124 is laterally positioned around the external surface 127 of the cylindrical adapter body 120. The sealing element 142 does not sit flush within the groove 124, but instead projects slightly beyond the external surface 127 of the cylindrical adapter body 120. Preferably, the sealing element 142 is an elastomeric O-ring having a diameter slightly larger than that of the cylindrical adapter body 120. This configuration allows the sealing element 142 to compress against the interior walls 217 of the bench dog hole 216 when inserted, thereby forming a leak-free seal and providing a tight friction fit that retains the cylindrical adapter body 120 securely in place.

Additional sealing elements may be positioned at spaced locations along the cylindrical adapter body 120 to further enhance vacuum retention, improve alignment stability within the bench dog hole 216, and maintain a consistent airtight interface during operation. The compression characteristics of the sealing element 142 allow the cylindrical adapter body 120 to accommodate dimensional variations among different bench dog holes 216. The elastomeric material of the sealing element 142 enables controlled radial deformation when inserted, permitting reliable sealing and retention even in bench dog holes 216 that vary slightly in diameter or surface finish. This feature ensures compatibility with a range of worktops 215 and multi-function tables, maintaining vacuum integrity and frictional stability regardless of minor manufacturing tolerances or chamfered versus non-chamfered hole geometries. The second sealing element 140 is also preferably an elastomeric O-ring made from similar materials such as EPDM, silicone elastomer, neoprene, nitrile elastomer, thermoplastic elastomers, or the like.

The threading 122 is distributed laterally within an inner surface along the through hole 125. The threading 122 connects the cylindrical adapter body 120 to the vacuum coupling 160 as well as to the cap 132. The groove 124 is laterally positioned around the external surface 127 of the cylindrical adapter body 120. The sealing element 142 is preferably an elastomeric O-ring made from materials such as EPDM, silicone elastomer, neoprene, nitrile elastomer, thermoplastic elastomers, or the like, that provides a leak free seal when the cylindrical adapter body 120 is inserted into the bench dog hole 216. The second sealing element 140 is also preferably an elastomeric O-ring made from similar materials.

As used herein, an elastomeric vacuum seal is a flexible, resilient sealing component made from an elastomer that conforms to the surface of a workpiece 820 or adapter interface to maintain an airtight seal when vacuum pressure is applied. Such a seal ensures that when the vacuum is drawn, air leakage around the workpiece 820 or fitting is minimized or eliminated, allowing sufficient negative pressure to develop for reliable clamping.

The gripping surface 126 is laterally distributed around the cylindrical adapter body 120 to make it easier to grip the cylindrical adapter body 120 when removing from the bench dog hole 216. The cylindrical adapter body 120 is constructed to accept the vacuum coupling 160 for attaching the vacuum source 318 connector by tapping the through hole 125 with threads compatible with the vacuum source 318 connector.

An elastomeric vacuum seal 270 is positioned on the top surface 202 of the worktop 215 around the bench dog hole 216, to provide a vacuum seal between the worktop 215 and a material being held by the worktop 215. The elastomeric vacuum seal 270 preferably comprises neoprene, silicone elastomer, or the like. The worktop 215 is configured to support and secure a variety of workpieces 820 during cutting, sanding, planing, routing, or assembly operations.

The elastomeric vacuum seal 270 is positioned on the top surface 202 of the worktop 215 and around the bench dog hole 216, with the cylindrical adapter body 120 and the cap 132 installed. Such a configuration provides a vacuum seal between the top surface 202 of the worktop 215 and the workpiece 820 being held by the vacuum that is created by the vacuum source 318.

Figure 3:
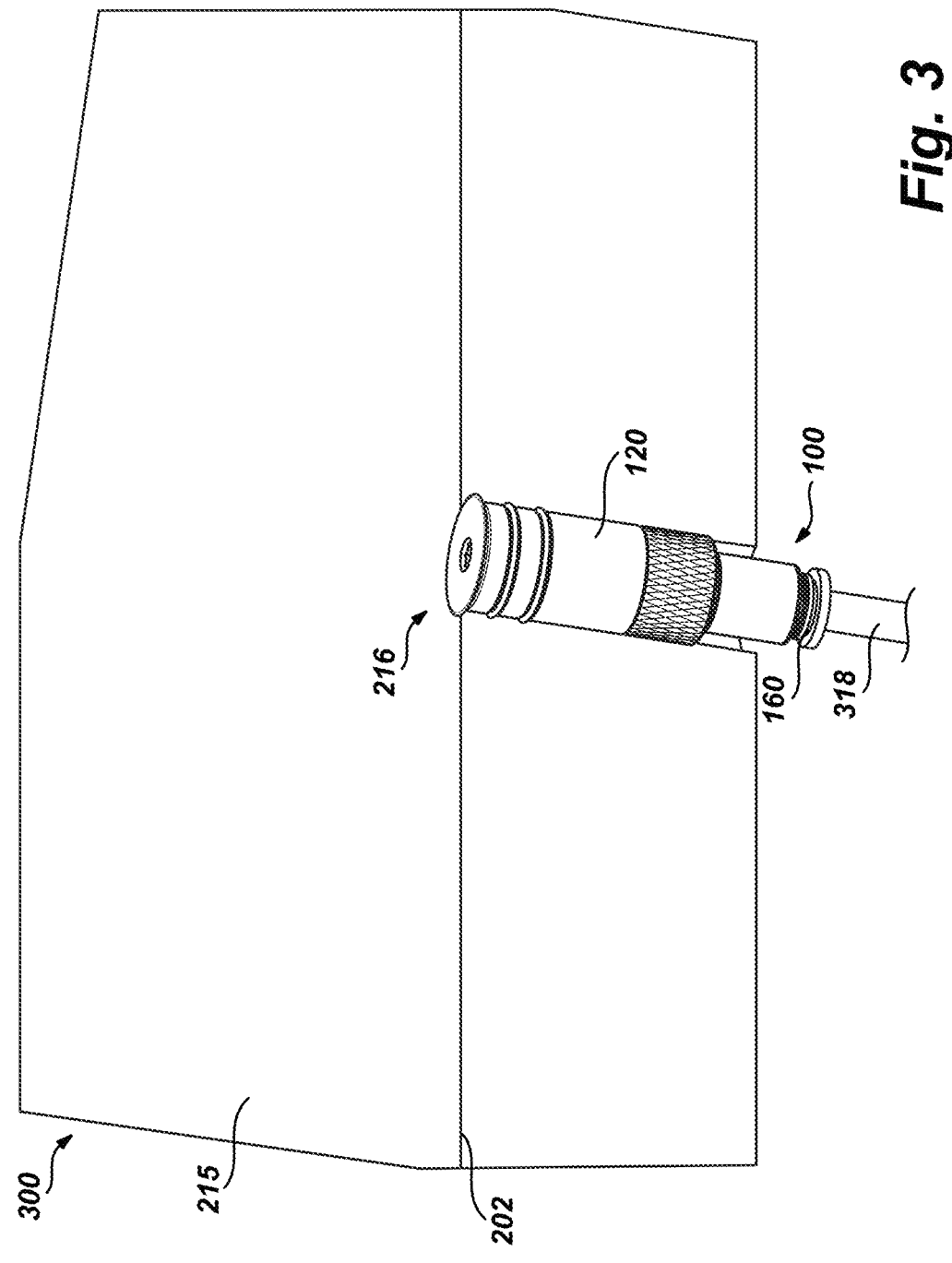
FIG. 3 illustrates a perspective view of the worktop showing the vacuum fitting adapter installed flush with a top surface, a portion of the worktop omitted for clarity of illustration.

FIG. 3 illustrates a perspective view of the worktop 215 showing the vacuum fitting adapter 100 installed flush with the top surface 202. The vacuum source 318 is connected via tubing below the worktop 215. As illustrated in FIG. 3, when installed, the top of the cap 132 sits flush with the top surface 202 of the worktop 215, such that it does not interfere with normal work and can remain installed when not in use. The cap 132 (FIG. 2) comprises a cap head, a threaded portion, and a through hole. The cap head is terminally mounted onto the threaded portion. The through hole traverses through the cap head and the threaded portion so that the vacuum passes through when in use.

Figure 4A:
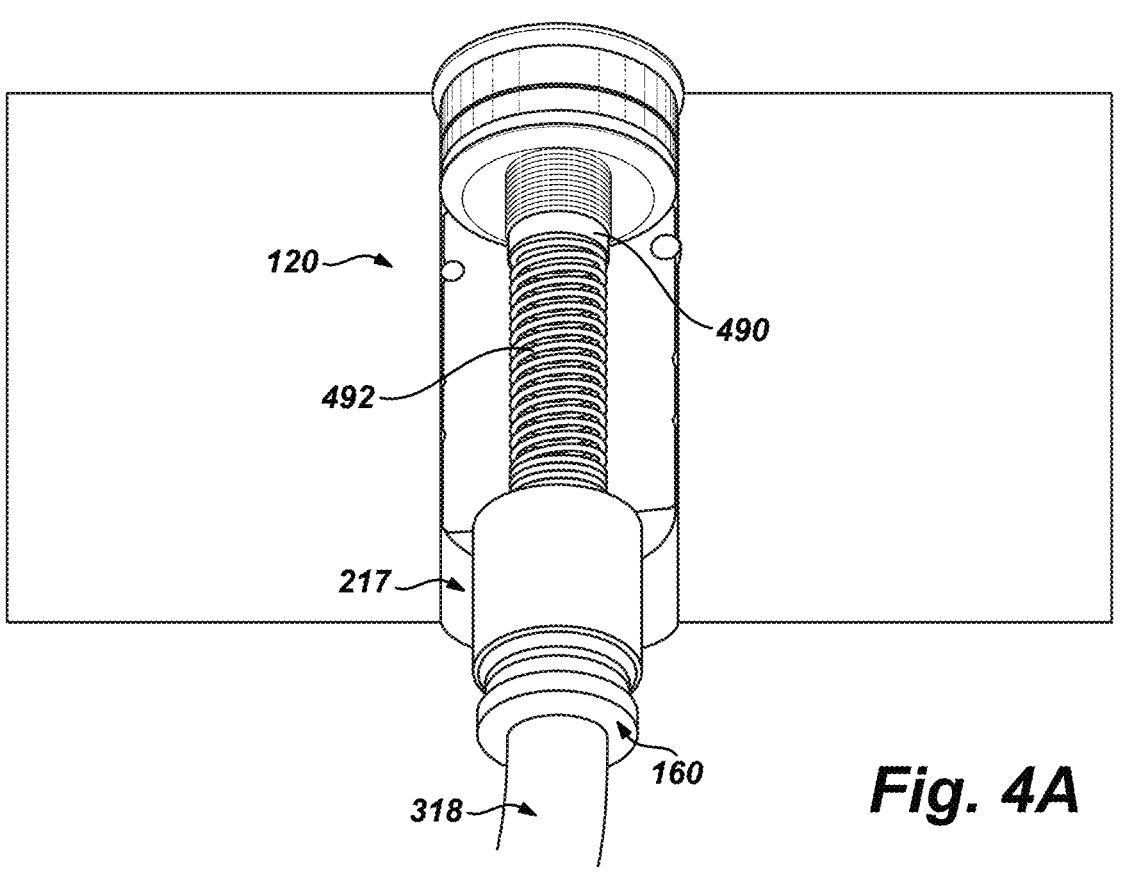
FIGS. 4A and 4B illustrate side and perspective views, respectively, of the adapter body having an in-line filter and spring, portions of the adapter body omitted for clarity of illustration.
Figure 4B:
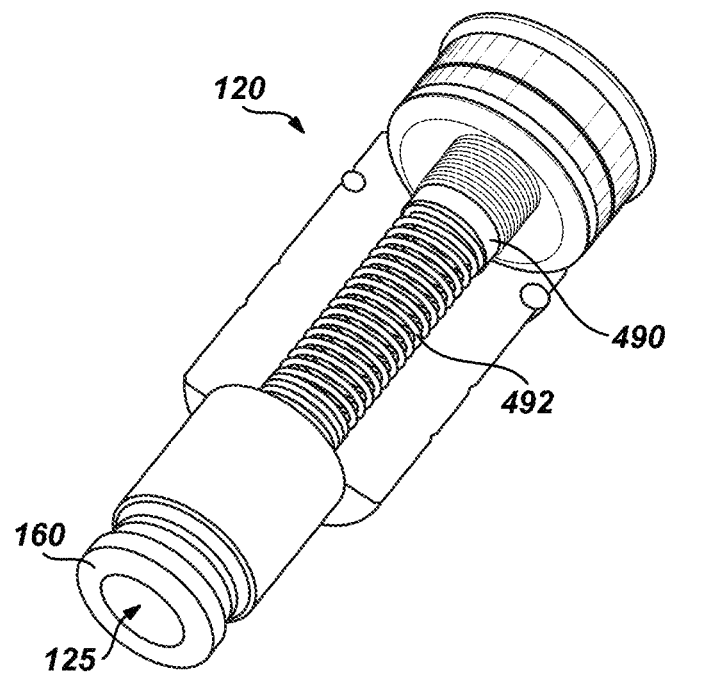

In-line filters 490 can be used on the vacuum clamping system discussed herein to keep dust and debris from entering the tubing system and pump. The through hole 125 of the vacuum fitting adapter 100 can be used to accomplish this. FIGS. 4A and 4B illustrate side and perspective views, respectively, of the cylindrical adapter body 120 having an in-line filter 490. A disc or cartridge filter having a suitable diameter and micron rating can be added to the through hole 125 and held in place by a spring 492 or equivalent biasing component. Such an in-line filter 490 is a protective component operative to trap particulate matter, such as dust, wood chips, or other debris before they can enter and damage the vacuum pump, clog the system, or reduce suction efficiency. The in-line filter 490 is installed within the through hole 125 of the cylindrical adapter body 120 and operative to filter particulate matter. The in-line filter 490 includes a filter element, such as a fine mesh, foam, sintered filter, cartridge, or other suitable porous material. Air flows through the in-line filter 490 as it's pulled from the workpiece 820 toward the vacuum source 318. Dust and debris are captured, while clean air continues to the vacuum source 318. Fine sawdust or chips from routing, sanding, or planing can easily be drawn into the vacuum line. Without a filter, such debris can foul the vacuum pump, block ports, or damage seals. The in-line filter 490 ensures consistent suction and can extend the life of the vacuum equipment.

Figure 5:
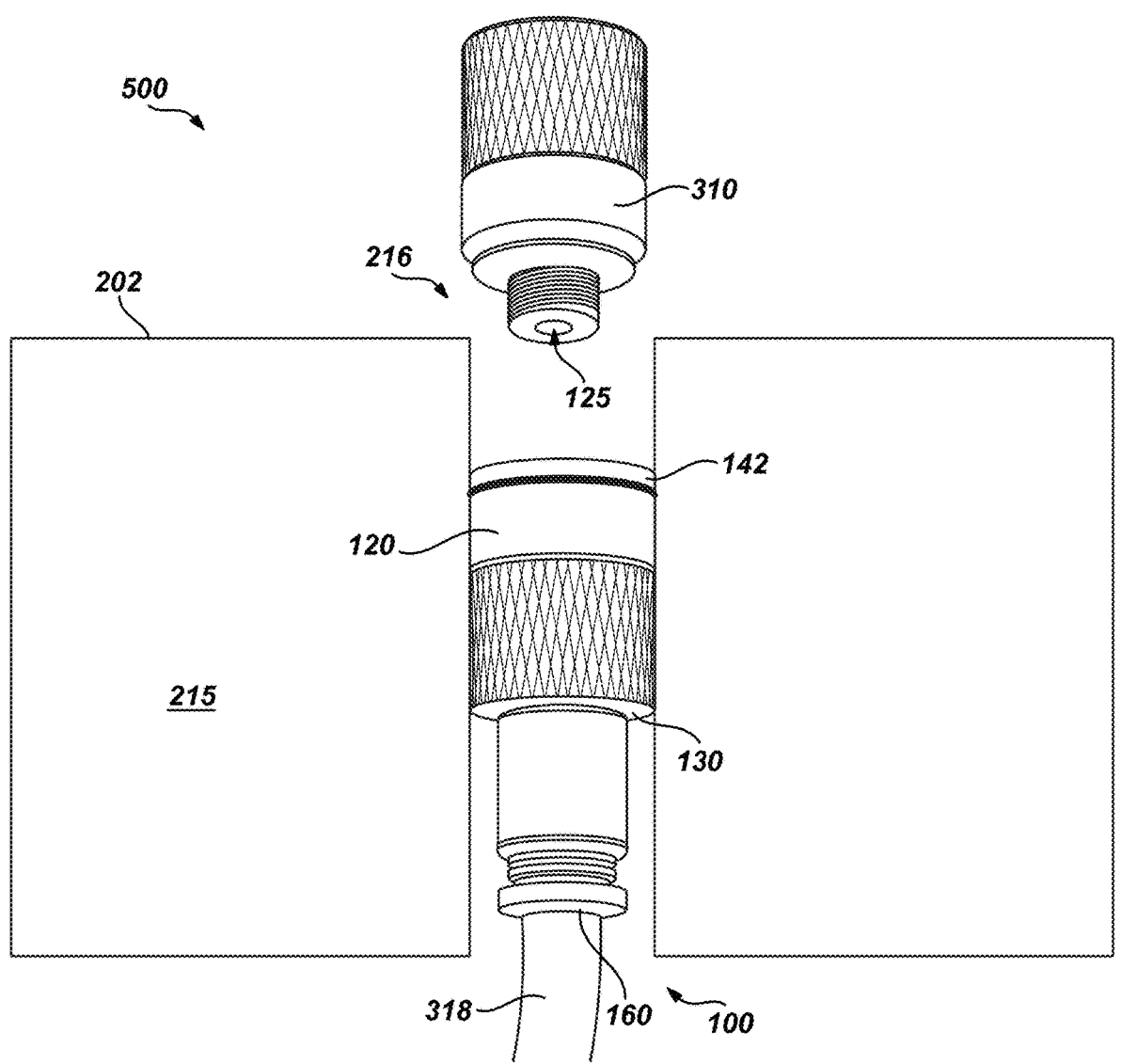
FIG. 5 provides a view showing an extractor and/or extender tool.

FIG. 5 provides a view showing an extractor tool 310. The extractor tool 310 is configured to couple with and pull the vacuum fitting adapter 100 from the worktop 215 through the bench dog hole 216 from the top side of the worktop 215.

The vacuum fitting adapter 100 further comprises the coupling elements 162 that attach below the cylindrical adapter body 120 to extend the cylindrical adapter body 120 downwardly for thicker worktops 215. The sealing element 142 creates a pressure fit that maintains the cylindrical adapter body 120 in position within the bench dog hole 216. The cylindrical adapter body 120 is configured to be removable by pushing the vacuum fitting adapter 100 up through the bench dog hole 216.

In some embodiments, the retention mechanism 150 may be actuated manually, pneumatically, or mechanically. A threaded member or cam can compress a flexible polymer housing, such as one formed from thermoplastic polyurethane, to expand radially against the interior sidewalls 217 of the bench dog hole 216. Such embodiments achieve substantially the same function—frictional retention and airtight sealing—as the friction-fit elastomeric O-ring sealing element 142 embodiment described herein.

The vacuum connection port 130 is configured to work with a vacuum clamping device positioned on the top surface 202 of the worktop 215 over the installed vacuum fitting adapter 100. The vacuum connection port 130 enables fluid communication between the vacuum fitting adapter 100 and the clamping device through the vacuum coupling 160, allowing negative pressure generated by an external vacuum source 318 to be transmitted through the vacuum fitting adapter 100 to the clamping device for securely holding the workpiece 820 on the worktop 215. The clamping device may include an elastomeric sealing interface that automatically conforms to the top surface 202 of the worktop 215 when vacuum is applied, producing a substantially airtight seal without requiring manual adjustment or additional gaskets. When the vacuum is released, the clamping device can be easily lifted and repositioned on any other area of the worktop 215 having a corresponding vacuum fitting adapter 100.

Figure 6:
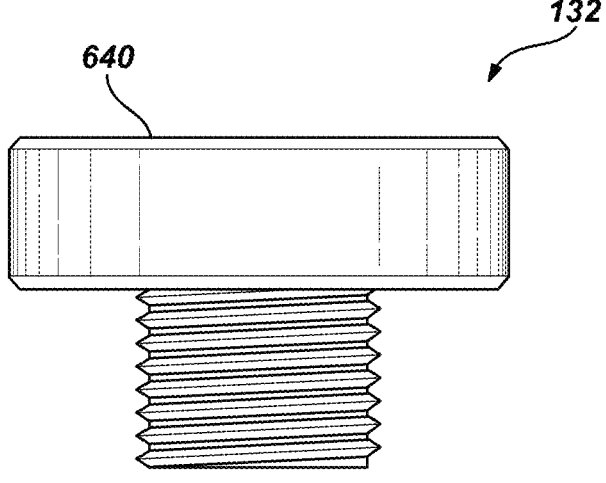
FIG. 6 provides side views of caps having non-chamfered top edge and chamfered top edge, respectively.
Figure 6:
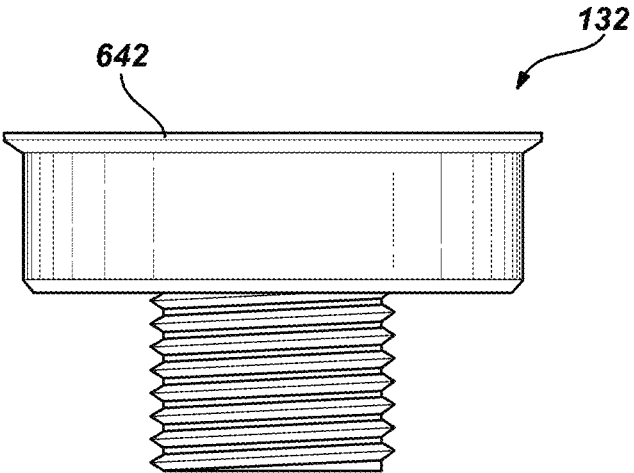
Figure 7:
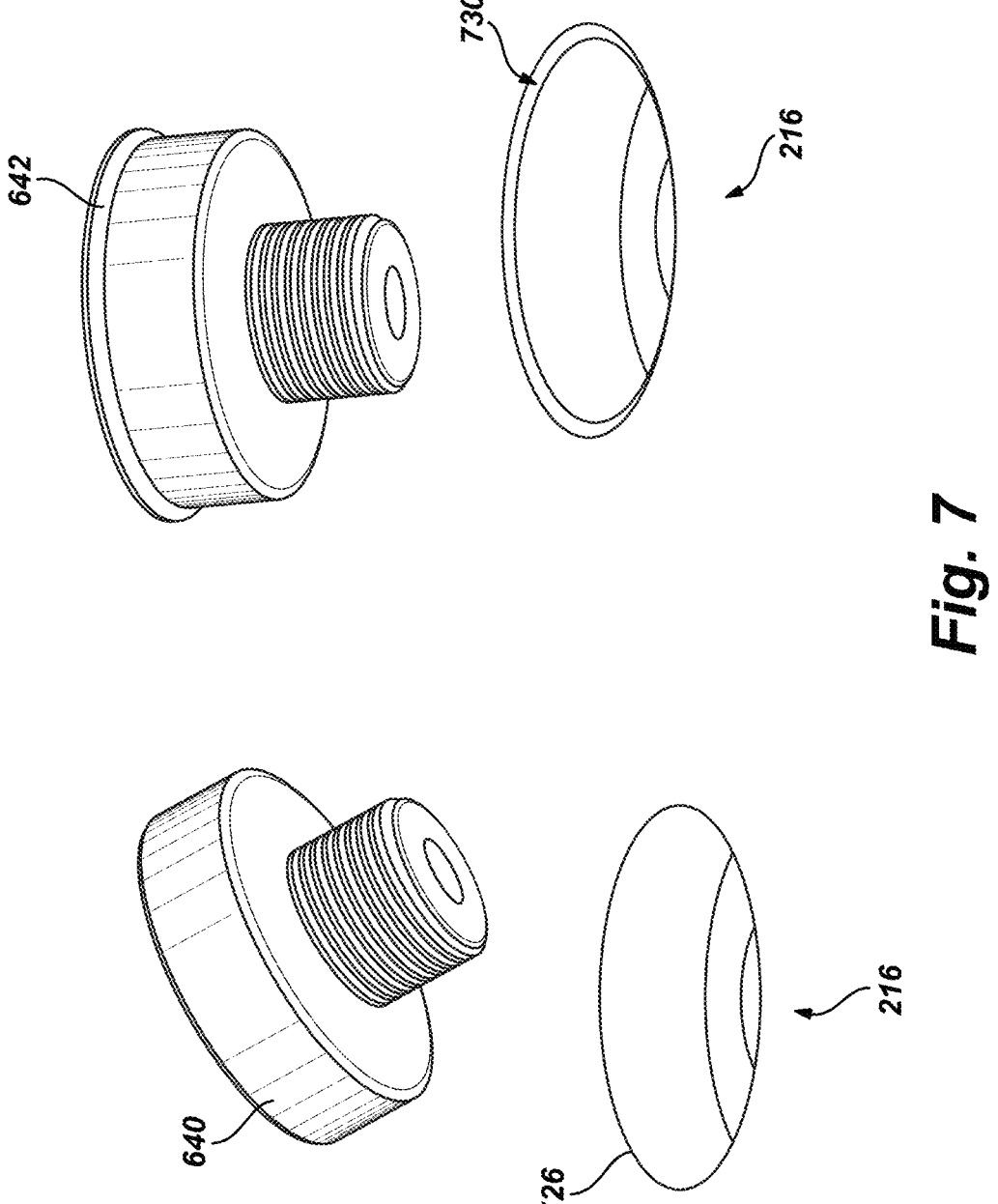
FIG. 7 illustrates perspective views of bench dog holes having non-chamfered edges and chamfered edges.

The vacuum fitting adapter 100 includes the cap 132. The cap 132 provides a protective top for a vacuum fitting when not in use. The cap 132 may include a non-chamfered top edge 640 or have a chamfered top edge 642. FIG. 6 provides side views of the cap 132 having the non-chamfered top edge 640 and the cap 132 having the chamfered top edge 642, respectively. The chamfer can soften the edge where the cap 132 meets another surface, improving fit and appearance. FIG. 7 illustrates perspective views of the bench dog hole 216 having non-chamfered edges 726 and the bench dog hole 216 having chamfered edges 730. The cap 132 includes the non-chamfered top edge 640 for bench dog holes 216 having non-chamfered edges 726 and the cap 132 has the chamfered top edge 642 for bench dog holes 216 having chamfered edges 730. The cap 132 is threaded onto the cylindrical adapter body 120 by hand, or by using a hex screwdriver, or other suitable tool if desired. The chamfered top edge 642 of the cap 132 acts as a stop and keeps the head flush with the top surface 202 when installed in the bench dog hole 216 having chamfered edges 730.

Figure 8:
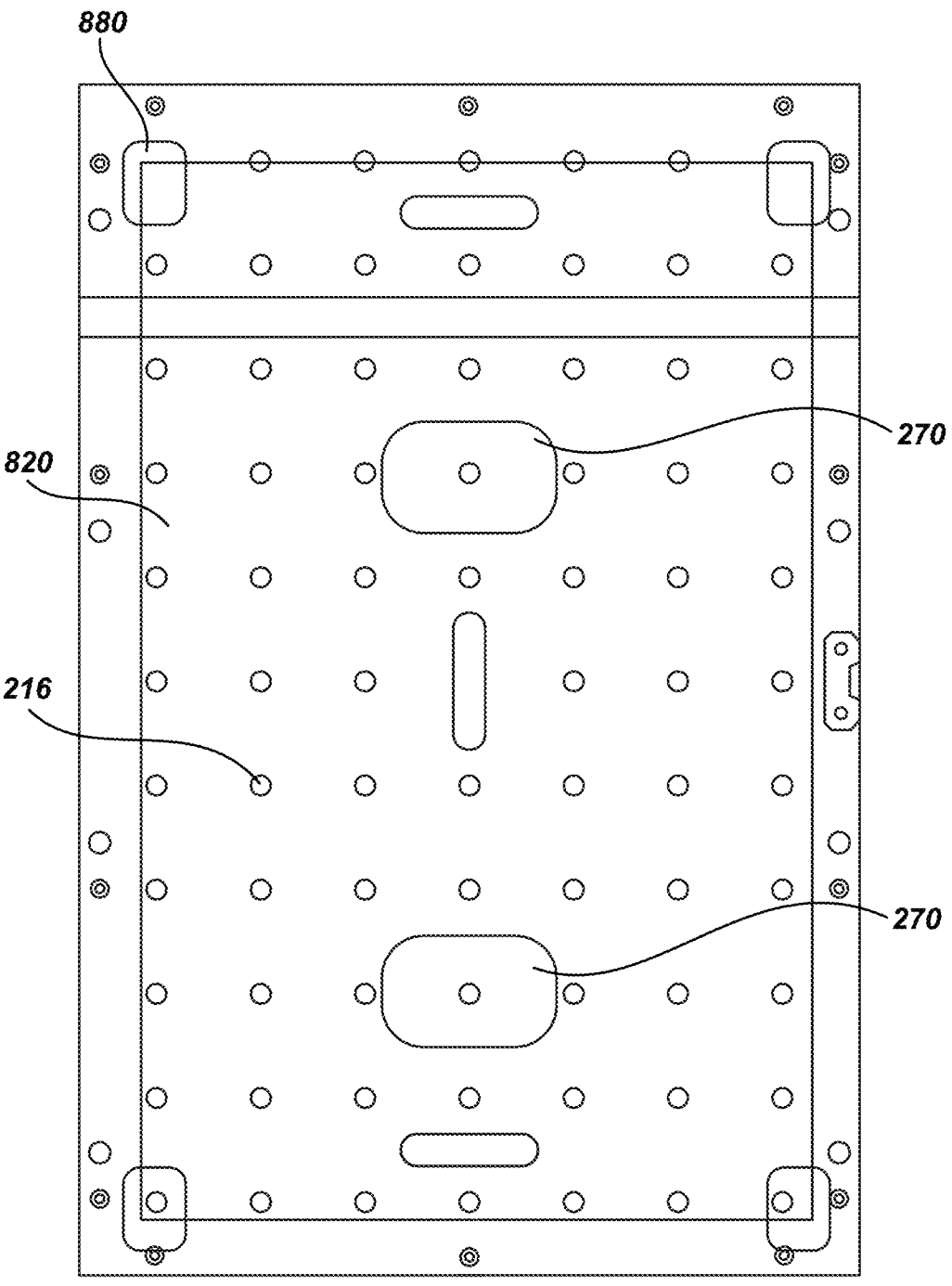
FIG. 8 is a plan view showing workpiece positioned on elastomeric vacuum seal.
Figure 9:
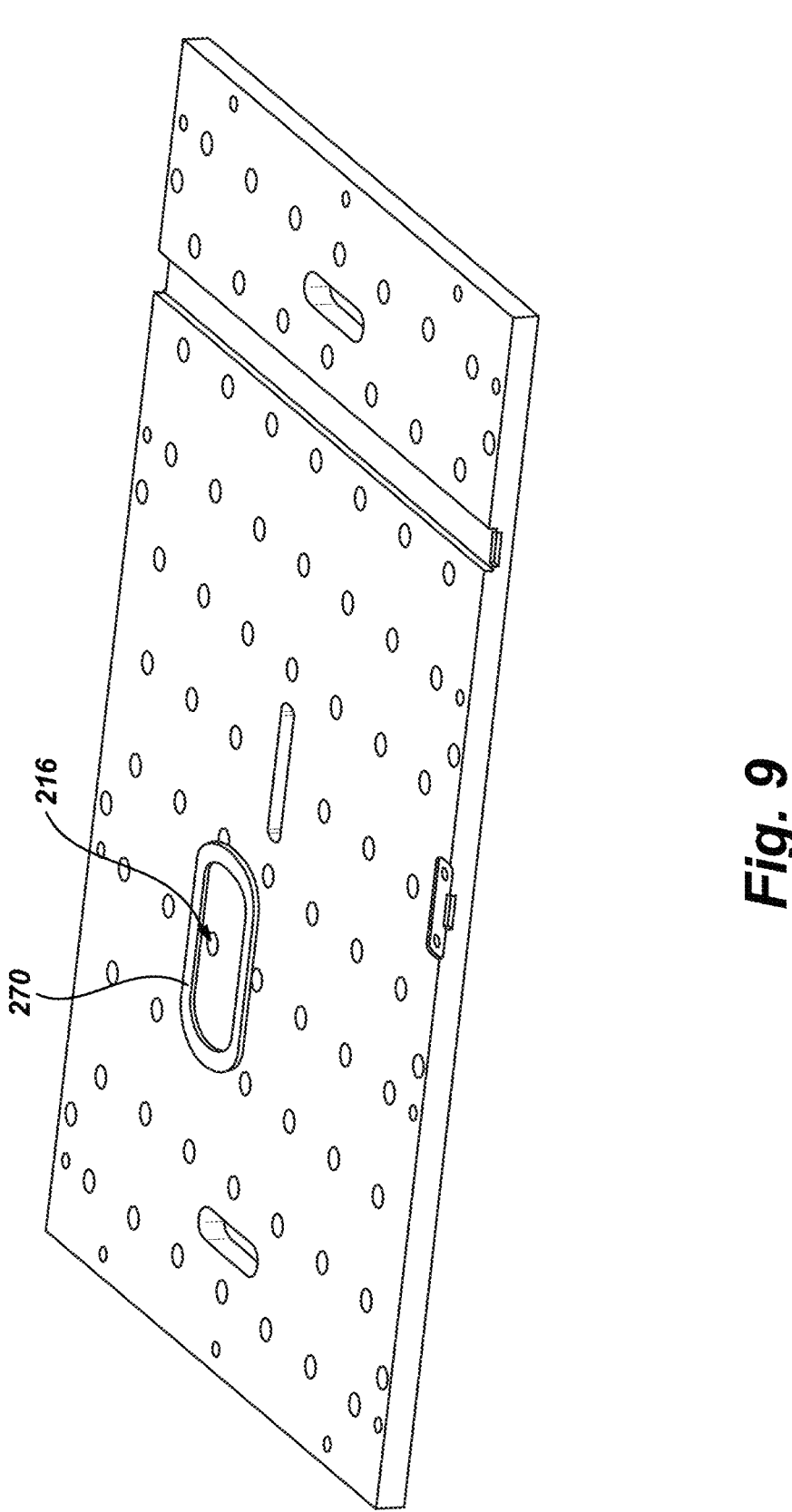
FIG. 9 is a perspective view of worktop having elastomeric vacuum seal around bench dog hole.
Figure 10:
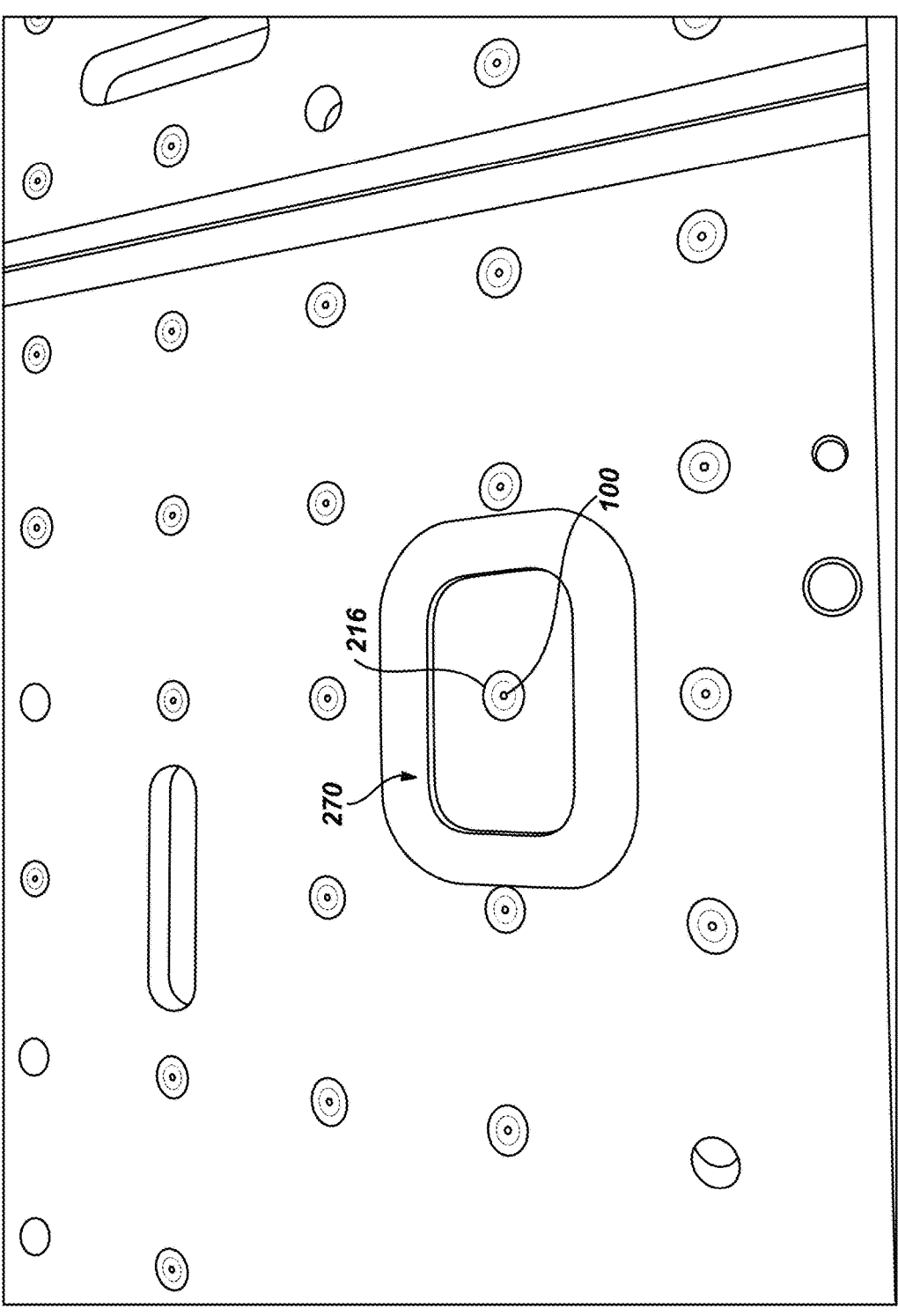
FIG. 10 provides top view of elastomeric vacuum seal around bench dog hole.

FIG. 8 is a plan view showing the workpiece 820 positioned on the elastomeric vacuum seal 270. FIG. 9 is a perspective view of the worktop 215 having the elastomeric vacuum seal 270 around the bench dog hole 216. FIG. 10 provides a top view of the elastomeric vacuum seal 270 around the bench dog hole 216. As illustrated in FIGS. 8 to 10, the elastomeric vacuum seal 270 can be placed around bench dog holes 216 to help grip the workpiece 820 material. One or more elastomeric gripping pads 880 are placed at one or more corners or edges of the workpiece 820 to help grip the workpiece 820 and keep larger workpieces 820 from flexing slightly. Using the teachings herein, the entire worktop 215 becomes a vacuum table, holding the workpiece 820 material securely to the workbench.

With the foregoing overview of vacuum fitting adapter 100 structures and corresponding worktops 215, it may be helpful now to consider a high-level discussion of an example process. FIG. 11 presents an illustrative process related to installing the vacuum fitting adapter 100 in the bench dog hole 216 of the worktop 215. For discussion purposes, the process is described with reference to FIGS. 1A, 1B, and 2.

The method 1100 includes, at block 1102, placing the sealing element 142 in the groove 124 on the cylindrical adapter body 120. At block 1104, placing the second sealing element 140 on the top of the cylindrical adapter body 120 and screwing in the cap 132 with threads passing through the center of the second sealing element 140, screwing the cap 132 until it makes contact with the second sealing element 140 without compressing the second sealing element 140. At block 1106, screwing the vacuum coupling 160 into threads of the vacuum connection port 130, and screwing the coupling element 162 if needed for thicker worktops 215. At block 1108, pushing the assembled vacuum fitting adapter 100 into the bench dog hole 216 from the top surface 202 of the worktop 215, with the sealing element 142 causing a friction fit as it is compressed against the interior sidewalls 217 of the bench dog hole 216. At block 1110, adjusting the cap 132 to compress the second sealing element 140 if needed to secure the vacuum fitting adapter 100 into the bench dog hole 216. At block 1112, connecting the vacuum source 318 to the vacuum coupling 160 to provide vacuum to the worktop 215.

The elastomeric vacuum seal 270 is placed on the top surface 202 of the workbench, centered over the installed vacuum fitting adapter 100. The workpiece 820 to be secured is then placed atop the elastomeric vacuum seal 270. The vacuum source 318 is turned on. When a vacuum is generated through the worktop 215, the workpiece 820 is sucked downward against the elastomeric vacuum seal 270 and securely held by the vacuum created.

During subsequent development and testing, it was determined that the previously described adjustable clamping collar in provisional patent application 63/844,448 filed Jul. 15, 2024, while effective for mechanically securing the vacuum fitting adapter 100 beneath the worktop 215, is not required for proper retention or sealing. It was realized that the cylindrical adapter body 120, when dimensioned appropriately and provided with a suitable sealing element 142, can achieve a tight friction fit and airtight seal within the bench dog hole 216 without any collar assistance.

While a particular form of the disclosure has been illustrated and described, it will be apparent that various modifications can be made without departing from the spirit and scope of the disclosure. The terms "sealing element 142" and "second sealing element 140" and "retention mechanism 150" are intended to encompass any structure that performs substantially the same function, in substantially the same way, to achieve substantially the same result as the embodiments disclosed, including but not limited to elastomeric O-rings, gaskets, sleeves, collars, deformable housings, or integral elastomeric components. The cylindrical adapter body 120, cap 132, and vacuum coupling 160 may be formed from metals, polymers, composites, or any combination thereof suitable for maintaining vacuum integrity and dimensional stability. While certain shapes of the vacuum fitting adapter 100 are illustrated, it will be understood that other shapes are supported as well. Similarly, different materials for the cylindrical adapter body 120 can be used, as appropriate for different environments, based on the heat dissipation and other relevant factors. Accordingly, it is not intended that the disclosure be limited, except as by the appended claims.

Particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure.

The above detailed description of the embodiments of the disclosure is not intended to be exhaustive or to limit the disclosure to the precise form disclosed above or to the particular field of usage mentioned in this disclosure. While specific embodiments of, and examples for, the disclosure are described above for illustrative purposes, various equivalent modifications are possible within the scope of the disclosure, as those skilled in the relevant art will recognize. Also, the teachings of the disclosure provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the disclosure can be modified, if necessary, to employ the systems, functions, and concepts of the various references described above to provide yet further embodiments of the disclosure.

Changes can be made to the disclosure in light of the above "Detailed Description." While the above description details certain embodiments of the disclosure and describes the best mode contemplated, no matter how detailed the above appears in text, the disclosure can be practiced in many ways. Therefore, implementation details may vary considerably while still being encompassed by the disclosure disclosed herein. As noted above, particular terminology used when describing certain features or aspects of the disclosure should not be taken to imply that the terminology is being redefined herein to be restricted to any specific characteristics, features, or aspects of the disclosure with which that terminology is associated.

While certain aspects of the disclosure are presented below in certain claim forms, the inventor contemplates the various aspects of the disclosure in any number of claim forms. Accordingly, the inventor reserves the right to add additional claims after filing the application to pursue such additional claim forms for other aspects of the disclosure.

What is claimed is:

1. A vacuum fitting adapter configured for installation in a bench dog hole of a worktop and configured for providing fluid communication between a vacuum source and the worktop, the vacuum fitting adapter comprising:

a cylindrical adapter body sized to be inserted into the bench dog hole, the cylindrical adapter body having a through hole traversing from a top end to a bottom end thereof;

the bottom end of the adapter body including a vacuum connection port;

a vacuum coupling attached to the vacuum connection port and configured for connection to the vacuum source;

at least one sealing element on the adapter body operative to reduce fluid leakage between the adapter body and the bench dog hole and to create a friction fit therebetween;

a retention mechanism fixed with the cylindrical adapter body and configured to press outwardly against an interior wall of the bench dog hole to enhance retention of the adapter body, wherein the retention mechanism includes a cap configured to expand the at least one sealing element radially outward to contact an interior sidewall of the bench dog hole.

2. The vacuum fitting adapter of claim 1 wherein the retention mechanism compresses a second sealing element distinct from the at least one sealing element to expand the second sealing element to contact the interior sidewall of the bench dog hole.

3. The vacuum fitting adapter of claim 2, wherein the at least one sealing element comprises an elastomeric O-ring.

4. The vacuum fitting adapter of claim 1, further comprising an elastomeric vacuum seal positioned on top of the worktop around the bench dog hole to provide a vacuum seal between the worktop and a workpiece being held by the worktop.

5. The vacuum fitting adapter of claim 4, wherein the elastomeric vacuum seal comprises at least one of Neoprene or silicon rubber.

6. A workholding system comprising:

a worktop having a bench dog hole;

a vacuum fitting adapter configured for installation in the bench dog hole, the vacuum fitting adapter comprising a cylindrical adapter body sized to be inserted into the bench dog hole, the cylindrical adapter body having a through hole traversing from a top end to a bottom end thereof, the bottom end including a vacuum connection port, a vacuum coupling attached to the vacuum connection port and configured for connection to a vacuum source, at least one sealing element on the adapter body operative to reduce fluid leakage between the adapter body and the bench dog hole and to create a friction fit therebetween, and a retention mechanism fixed with the cylindrical adapter body and configured to press outwardly against an interior wall of the bench dog hole to enhance retention of the adapter body, wherein the retention mechanism includes a cap configured to expand the at least one sealing element radially outward to contact an interior sidewall of the bench dog hole; and an elastomeric vacuum seal positioned on a top surface of the worktop around the bench dog hole to provide a vacuum seal between the worktop and a workpiece.

7. The vacuum fitting adapter of claim 1, further comprising an in-line filter installed within the through hole of the adapter body and operative to filter particulate matter.

8. The vacuum fitting adapter of claim 1, wherein the adapter body comprises at least one groove laterally positioned around an external surface of the adapter body and configured to receive the at least one sealing element.

9. The vacuum fitting adapter of claim 1, wherein the cap includes a non-chamfered top edge for bench dog holes having non-chamfered edges.

10. The vacuum fitting adapter of claim 1, wherein the cap has a chamfered top edge for bench dog holes having chamfered edges.

11. The vacuum fitting adapter of claim 1, further comprising one or more coupling elements that attach below the adapter body to extend the adapter body downwardly for thicker worktops.

12. The vacuum fitting adapter of claim 1, wherein the adapter body is configured to be removable by pushing the vacuum fitting adapter up through the bench dog hole.

13. The vacuum fitting adapter of claim 1, wherein the adapter body comprises a gripping surface laterally distributed around the adapter body to facilitate insertion and removal from the bench dog hole.

14. A method of installing a vacuum fitting adapter in a bench dog hole of a worktop, the method comprising:

providing a vacuum fitting adapter comprising a cylindrical adapter body sized to be inserted into the bench dog hole, the cylindrical adapter body having a through hole traversing from a top end to a bottom end thereof, the bottom end including a vacuum connection port, a vacuum coupling attached to the vacuum connection port and configured for connection to a vacuum source, at least one sealing element on the adapter body operative to reduce fluid leakage between the adapter body and the bench dog hole and to create a friction fit therebetween, a retention mechanism fixed with the cylindrical adapter body and configured to press outwardly against an interior wall of the bench dog hole to enhance retention of the adapter body, wherein the retention mechanism includes a cap configured to expand the at least one sealing element radially outward to contact an interior sidewall of the bench dog hole;

placing the sealing element in a groove on the adapter body;

placing a sealing element on a top of the adapter body and screwing in the cap with threads thereof passing through a center of the sealing element, screwing the cap until it makes contact with the sealing element without compressing the sealing element;

screwing the vacuum coupling into threads of the vacuum connection port;

pushing the assembled vacuum fitting adapter into the bench dog hole from a top of the worktop, with the sealing elements causing a friction fit as they are compressed against interior walls of the bench dog hole;

adjusting the cap to compress the sealing element radially outward to contact the interior walls of the bench dog hole and secure the vacuum fitting adapter into the bench dog hole; and connecting the vacuum source to the vacuum coupling to provide vacuum to the worktop.

15. The method of claim 14, wherein pushing the assembled vacuum fitting adapter into the bench dog hole from the top of the worktop further includes:

a top of the cap being positioned flush with the top surface of the worktop or slightly below it, unless the bench dog hole is chamfered in which case a chamfered top edge of the cap limits insertion.

\* \* \* \* \*